(12) United States Patent
Nelson

(10) Patent No.: US 12,046,960 B2
(45) Date of Patent: Jul. 23, 2024

(54) COLLECTOR RING ASSEMBLY

(71) Applicant: Illinois Tool Works Inc., Glenview, IL (US)

(72) Inventor: Jonathon James Nelson, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 21 days.

(21) Appl. No.: 17/866,784

(22) Filed: Jul. 18, 2022

(65) Prior Publication Data
US 2023/0018234 A1 Jan. 19, 2023

Related U.S. Application Data

(60) Provisional application No. 63/223,380, filed on Jul. 19, 2021.

(51) Int. Cl.
*H02K 13/00* (2006.01)
*H01R 39/08* (2006.01)

(52) U.S. Cl.
CPC .......... *H02K 13/003* (2013.01); *H01R 39/08* (2013.01)

(58) Field of Classification Search
CPC ...... H02K 13/003; H02K 5/141; H02K 5/143; H02K 9/28; H02K 17/22; H01R 39/08
USPC ....................................................... 310/232
See application file for complete search history.

(56) References Cited

U.S. PATENT DOCUMENTS

| | | | | |
|---|---|---|---|---|
| 1,137,510 A | * | 4/1915 | Mattman | H02K 9/28 |
| | | | | 310/227 |
| 1,492,708 A | * | 5/1924 | Haage | H01R 39/04 |
| | | | | 310/236 |
| 2,623,188 A | * | 12/1952 | Le Tourneau | H01R 39/085 |
| | | | | 439/28 |
| 3,842,301 A | * | 10/1974 | Smith | H01R 39/14 |
| | | | | 439/13 |
| 3,976,903 A | | 8/1976 | Cotton | |
| 3,994,542 A | * | 11/1976 | Wojdyla | F16C 33/20 |
| | | | | 384/215 |
| 2001/0010738 A1 | * | 8/2001 | Johnson | F16D 1/0864 |
| | | | | 384/537 |
| 2023/0018234 A1 | * | 1/2023 | Nelson | H01R 39/08 |

FOREIGN PATENT DOCUMENTS

DE 3130595 * 2/1983

OTHER PUBLICATIONS

WO 9005395; Koplin Karl-Heinz, Fasterding Henning (Year: 1989).*
EP 3683902; Löhrmann Stephan (Year: 2019).*
1 Canadian Examiner Requisition Appln No. 3,168,225 dated Nov. 3, 2023.

* cited by examiner

*Primary Examiner* — Ahmed Elnakib
(74) *Attorney, Agent, or Firm* — McAndrews, Held & Malloy, Ltd.

(57) ABSTRACT

The present disclosure relates generally to a collector ring assembly for use in a rotor comprising a collector (or slip) ring body and a shaft in which the collector ring body and shaft each have mating features so that the collector ring body may be lockably attached to the shaft.

18 Claims, 4 Drawing Sheets

COLLECTOR RING ASSEMBLY

CROSS-REFERENCE TO RELATED APPLICATION

This application claims benefit of priority from U.S. Provisional Patent Application No. 63/223,380, filed Jul. 19, 2021, which is hereby incorporated by reference in its entirety herein.

BACKGROUND

Numerous engineering products, including electrical generators used to create generator output, include a rotor. A rotor may contain a collector ring assembly. A collector ring assembly may include an insulator upon which may be positioned a one or more (such as a pair) of electrically conductive collector rings.

BRIEF DESCRIPTION

According to one aspect of the present disclosure, a collector ring assembly comprises a shaft extending along a longitudinal axis from a proximal end to a distal end, a collector ring body, and at least one collector ring that is positioned on and retained by the collector ring body. The shaft comprises a radial axis extending away from the longitudinal axis and a surface that circumscribes the longitudinal axis at a distance along the radial axis. The collector ring body fits over the surface of the shaft. The shaft comprises a shaft mating feature. The collector ring body comprises a collector ring mating feature. The shaft mating feature and the collector ring mating feature lockably engage to secure the collector ring body to the shaft such that the collector ring body is limited from being able to move either along, or rotatably around, the longitudinal axis.

According to another aspect of the present disclosure, a collector ring assembly comprises a shaft extending along a longitudinal axis from a proximal end to a distal end, a collector ring body, at least one collector ring that is positioned on and retained by the collector ring body, and a clamp. The shaft comprises a radial axis extending away from the longitudinal axis and a surface that circumscribes the longitudinal axis at a distance along the radial axis. The collector ring body fits over the surface of the shaft. The collector ring body comprises an extension. The shaft comprises a shaft mating feature. The clamp comprises a clamp mating feature. The shaft mating feature and the clamp mating feature lockably engage with the collector ring body's extension located between the shaft mating feature and the clamp mating feature to secure the collector ring body to the shaft such that the collector ring body is limited from being able to move either along, or rotatably around, the longitudinal axis.

According to another aspect of the present disclosure, a method for securing a collector ring body to a shaft comprises attaching a collector ring body to a shaft by sliding the collector ring body over the shaft until a collector ring mating feature lockably engages with a shaft mating feature to secure the collector ring body to the shaft such that the collector ring body is limited from being able to move either along, or rotatably around, a longitudinal axis. The shaft extends along the longitudinal axis from a distal end to a proximal end. The shaft comprises a radial axis extending away from the longitudinal axis and a surface that circumscribes the longitudinal axis at a distance along the radial axis. The collector ring body fits over the surface of the shaft.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DRAWINGS

The following is a description of the examples depicted in the accompanying drawings. The figures are not necessarily to scale, and certain features and certain views of the figures may be exaggerated in scale or in schematic for clarity or conciseness.

Figure 1A:
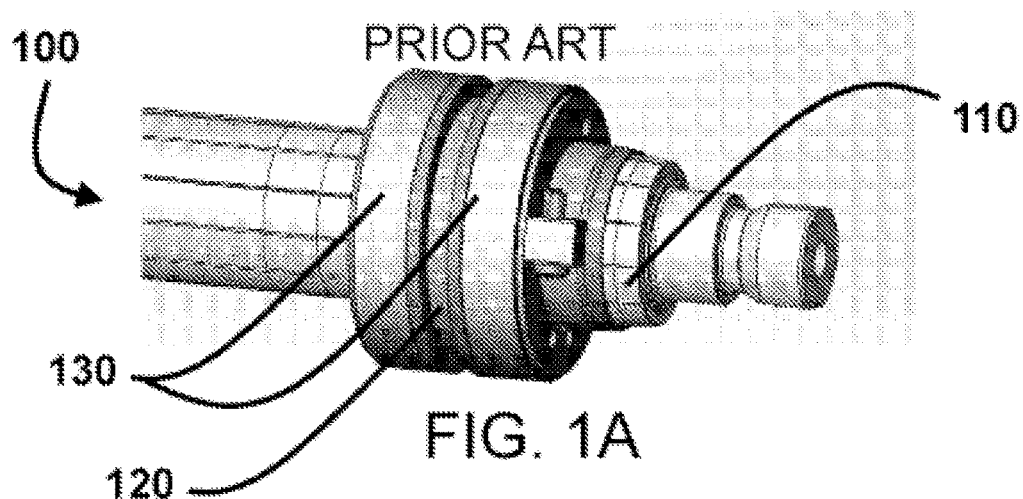
FIG. 1A illustrates an example existing collector ring assembly.

The foregoing summary, as well as the following detailed description, will be better understood when read in conjunction with the figures. It should be understood that the claims are not limited to the arrangements and instrumentality shown in the figures. Furthermore, the appearance shown in the figures is one of many ornamental appearances that can be employed to achieve the stated functions of the apparatus.

DETAILED DESCRIPTION

In the following detailed description, specific details may be set forth to provide a thorough understanding of the embodiments of the present disclosure. However, it will be clear to one skilled in the art when disclosed examples may be practiced without some or all of these specific details. For the sake of brevity, well-known features or processes may not be described in detail. In addition, like or identical reference numerals may be used to identify common or similar elements.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

According to certain embodiments of the present disclosure, a collector ring assembly may be used as part of a rotor assembly, such as one used in a generator. The generator may be coupled to an engine and used to create generator output.

Figure 1B:
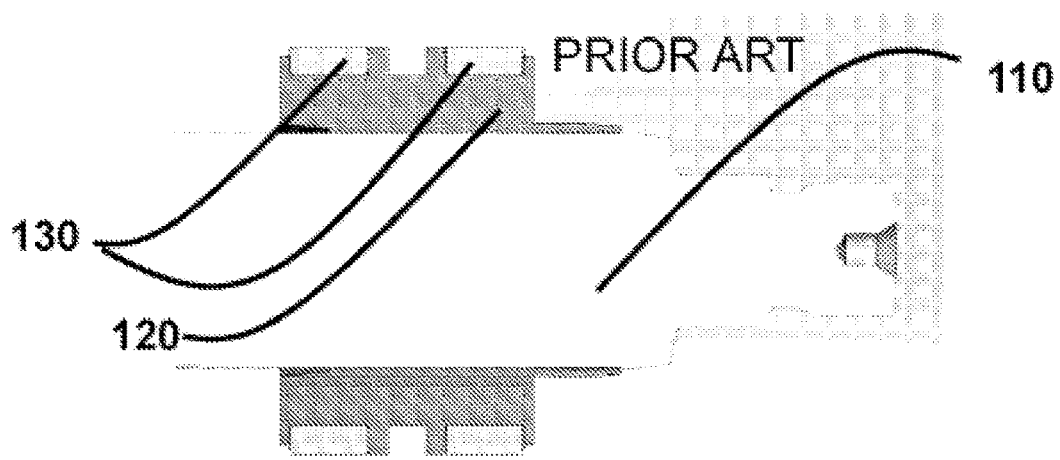
FIG. 1B illustrates an example existing collector ring assembly.
Figure 1C:
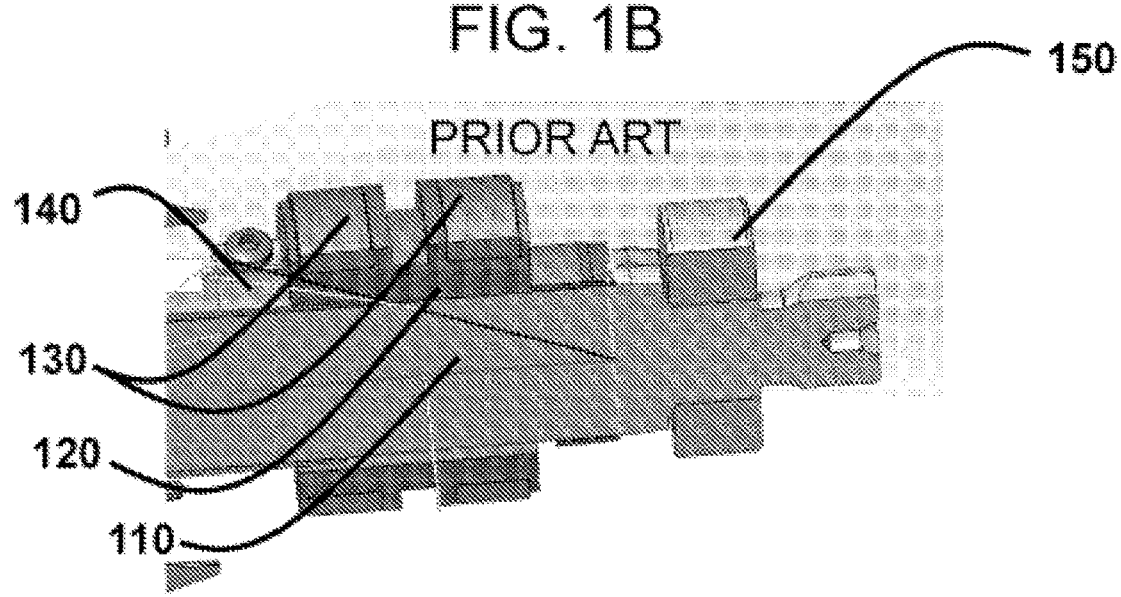
FIG. 1C illustrates an example existing collector ring assembly.

FIGS. 1A to 1C illustrate an existing collector ring assembly 100. This existing collector ring assembly 100 comprises a collector ring body 120 to which are secured a pair of first and second spaced, electrically conductive collector rings 130, 130. The collector ring body 120 is fitted over a shaft 110 and attached via an interference fit. A rotor clip 140 may be used to help secure the collector ring body 120 to the shaft 110. The collector ring assembly 100 may also comprise a bearing 150.

Figure 2A:
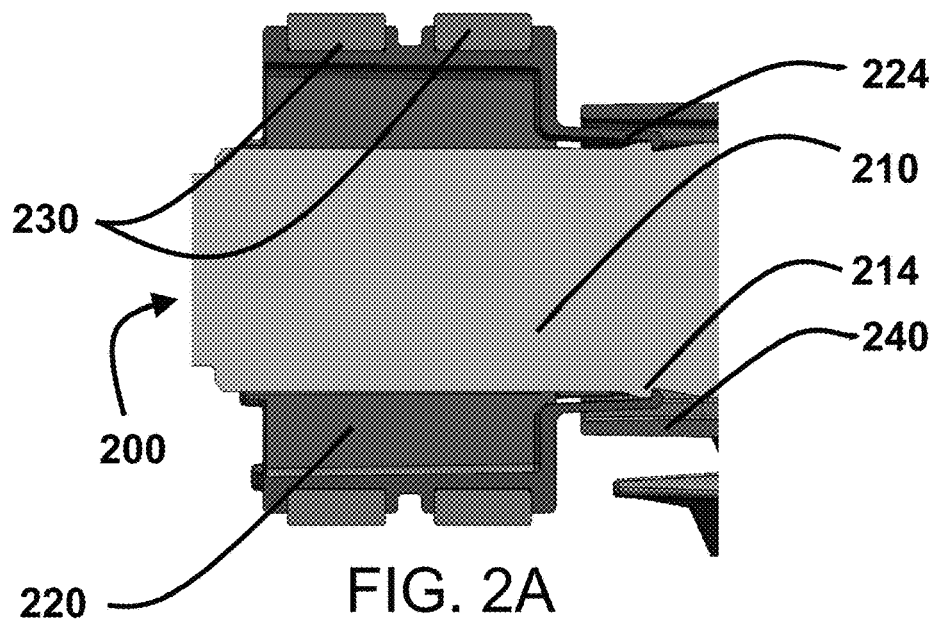
FIG. 2A illustrates an example collector ring assembly according to the present disclosure.
Figure 2B:
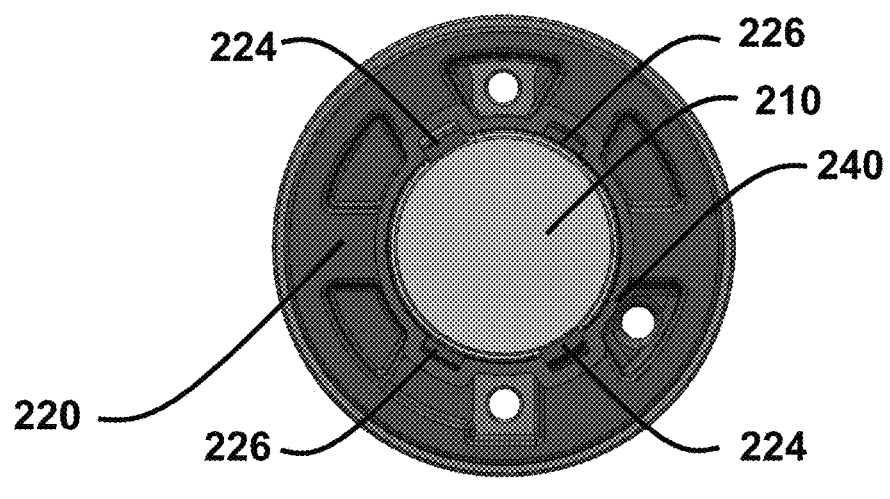
FIG. 2B illustrates an example collector ring assembly according to the present disclosure.
Figure 2C:
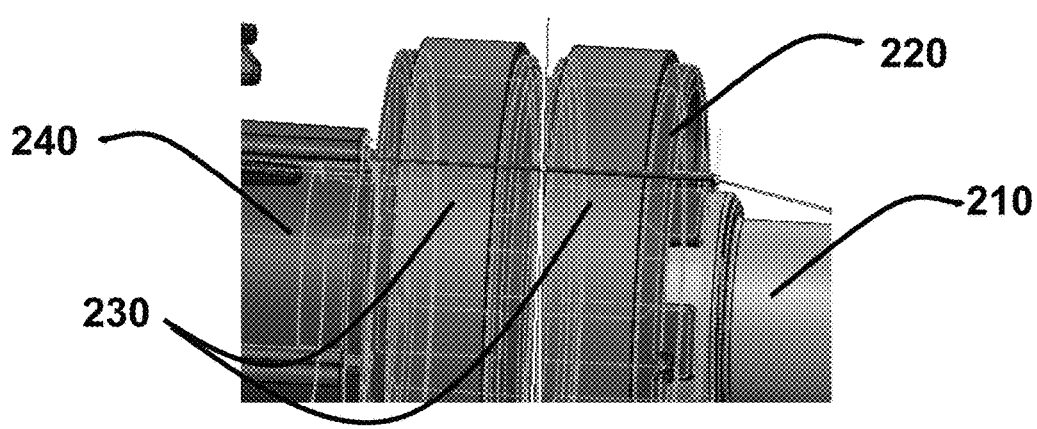
FIG. 2C illustrates an example collector ring assembly according to the present disclosure.

FIGS. 2A to 2C illustrate a collector ring assembly 200 according to certain embodiments of the present disclosure. This collector ring assembly 200 comprises a shaft 210 extending along a longitudinal axis from a proximal end to a distal end. The shaft 210 comprises a shaft mating feature 214. The shaft 210 comprises a radial axis extending away from the longitudinal axis and a surface that circumscribes the longitudinal axis at a distance along the radial axis. The collector ring assembly 200 comprises a collector ring body 220 and a collector ring mating feature 224. The collector ring body 220 may be made of an insulator, such as a plastic. The collector ring body 220 may be a unitary structure defining a central rotor shaft bore defining a central longitudinal axis. First and second spaced, electrically conductive collector rings 230, 230 may be positioned on and retained by the collector ring body 220 (or otherwise secured to the collector ring body 220). The collector ring body 220 may be formed by injection molding, and can be molded with the collector. The collector ring body 220 fits over the surface of the shaft 210. The shaft mating feature 214 and the collector ring mating feature 224 lockably engage to secure the collector ring body 220 to the shaft 210 such that the collector ring body 220 is limited from being able to move either along, or rotatably around, the longitudinal axis. According to an alternative embodiment, the collector ring body may be secured to the shaft both via the lockable engagement of the shaft and collector ring mating features and an interference fit between the shaft and the collector ring body. The shaft mating feature 214 may be a mating ring 214 that extends away from the surface along the radial axis. The collector ring assembly 200 may additionally comprise a rotor clip 240. The rotor clip 240 may be an electrical insulator. The rotor clip 240 may engage with the collector ring body 220 to limit rotation of the collector ring body 220 around the longitudinal axis. According to certain embodiments, the collector ring mating feature 224 may be a cantilevered clip 224 extending along the longitudinal axis towards the distal end, wherein the cantilevered clip is biased towards the shaft 210 along the radial axis. The collector ring body 220 may additionally comprise anti-rotation bosses 226 that are configured to engage with the rotor clip 240 to limit rotation of the collector ring body 220 around the longitudinal axis. For example, the collector ring body 220 may include two anti-rotation bosses 226 and two cantilevered clips 224. According to other embodiments, the collector ring body 220 may include more than two anti-rotation bosses 226 and more than two cantilevered clips 224.

According to alternative embodiments of the present disclosure, the shaft mating feature 214 may be an annular mating groove that extends inwards from the surface along the radial axis. In such embodiments, the collector ring mating feature 224 may be an annular ring or a cantilevered clip extending along the longitudinal axis towards the distal end, wherein the cantilevered clip is biased towards the shaft along the radial axis.

According to alternative embodiments of the present disclosure, the shaft mating feature 214 may be a plurality of mating protrusions that extend away from the surface along the radial axis. In such embodiments, the collector ring mating feature 224 may be a plurality of cantilevered clips extending along the longitudinal axis towards the distal end, wherein the cantilevered clips are biased towards the shaft along the radial axis.

According to alternative embodiments of the present disclosure, the shaft mating feature 214 may be a plurality of mating depressions that extend inwards from the surface along the radial axis. In such embodiments, the collector ring mating feature 224 may be a plurality of cantilevered clips extending along the longitudinal axis towards the distal end, wherein the cantilevered clips are biased towards the shaft along the radial axis.

According to alternative embodiments of the present disclosure, a collector ring assembly may comprise a shaft extending along a longitudinal axis from a proximal end to a distal end, a collector ring body, and a clamp. The collector ring body fits over the surface of the shaft. The collector ring body has an extension. The shaft comprises a shaft mating feature. The clamp comprises a clamp mating feature. The clamp may be a rotor clip. The clamp may be an electrical insulator. The shaft mating feature and the clamp mating feature may lockably engage with the collector ring's extension located between the shaft mating feature and the clamp mating feature to secure the collector ring body to the shaft such that the collector ring body is limited from being able to move either along, or rotatably around, the longitudinal axis. Alternatively, the clamp may provide an interference fit (without a lockable engagement) that secures the collector ring body to the shaft. Or, the clamp may provide both an interference fit and a lockable engagement to secure the collector ring body to the shaft. According to certain embodiments, the shaft mating feature may be a mating ring that extends away from the surface along the radial axis, or an annular mating groove that extends inwards from the surface along the radial axis, or a plurality of mating protrusions that extend away from the surface along the radial axis, or a plurality of mating depressions that extend inwards from the surface along the radial axis. According to certain embodiments, the clamp mating feature may be a cantilevered clip, wherein the cantilevered clip is biased towards the shaft along the radial axis, or a plurality of cantilevered clips. According to certain embodiments, the clamp mating feature and the shaft mating feature are threaded connectors.

According to alternative embodiments of the present disclosure, first and second collector ring assemblies according to the present disclosure may be used in conjunction with one another, wherein the first collector ring assembly includes one collector ring positioned on and retained by a first collector ring body and the second collector ring assembly includes two spaced collector rings positioned on and retained by a second collector ring body.

According to alternative embodiments of the present disclosure, a collector ring assembly may include a first collector body that is secured to a shaft using a shaft mating feature and a collector ring mating feature according to the present disclosure, and a second collector body that is secured to the shaft using an interference fit. Each collector body may have a single (or more than one) collector ring positioned on and retained by the collector ring body.

According to alternative embodiments of the present disclosure, a collector ring assembly may include more than two spaced collector rings positioned on and retained by a collector ring body.

Figure 3:
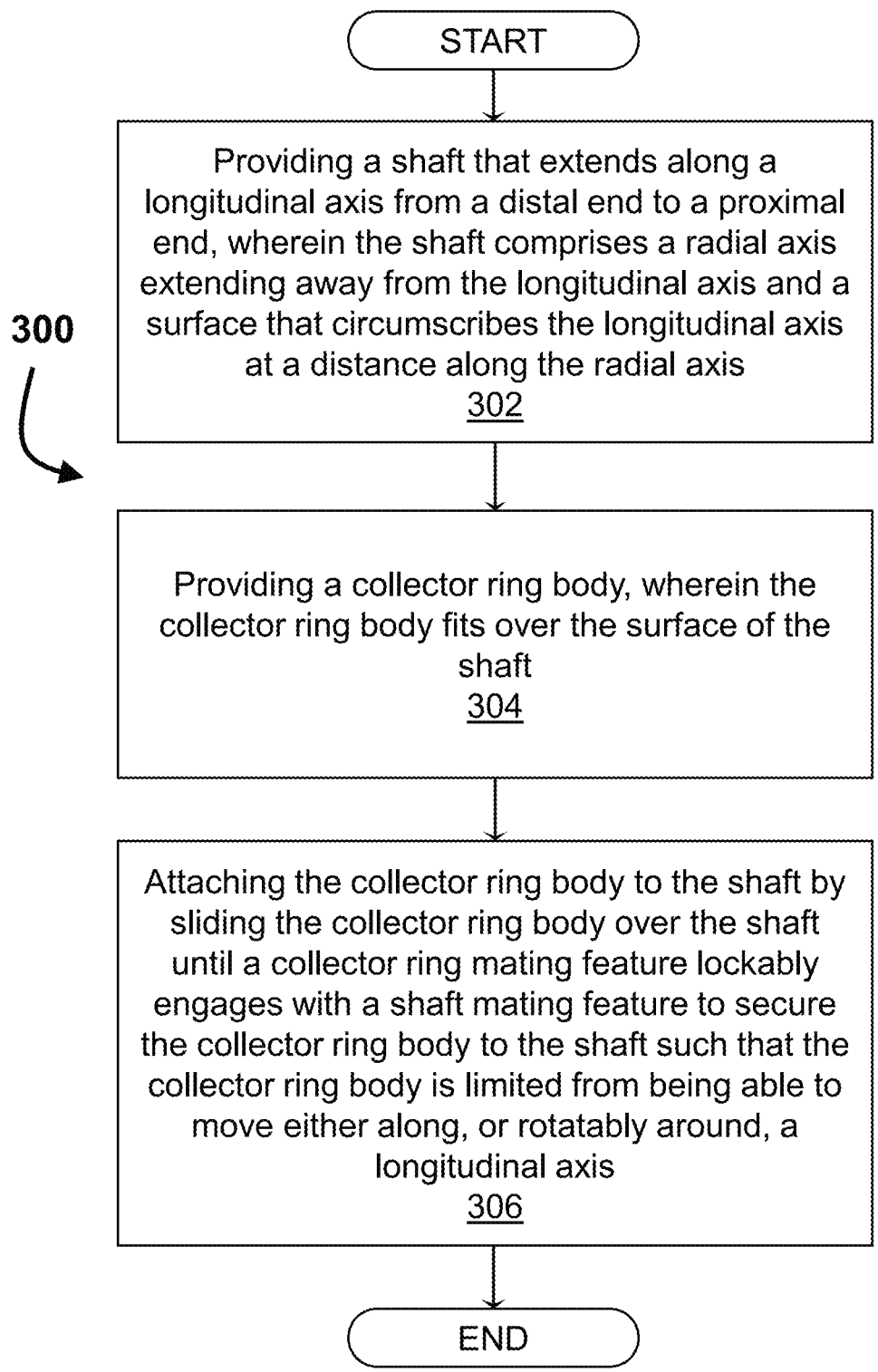
FIG. 3 is a flow chart illustrating an example method for securing a collector ring to a shaft as part of a rotor assembly.

FIG. 3 illustrates a method for securing a collector ring body to a shaft according to certain embodiments of the present disclosure. According to this method, a shaft is provided 302 that extends along a longitudinal axis from a distal end to a proximal end, wherein the shaft comprises a radial axis extending away from the longitudinal axis and a surface that circumscribes the longitudinal axis at a distance along the radial axis. In addition, a collector ring body is provided 304, wherein the collector ring body fits over the surface of the shaft. According to certain embodiments, the collector ring body is attached 306 to the shaft by sliding the collector ring body over the shaft until a collector ring mating feature lockably engages with a shaft mating feature to secure the collector ring body to the shaft such that the collector ring body is limited from being able to move either along, or rotatably around, a longitudinal axis. According to certain other embodiments, a clamp is additionally provided, and the clamp is used to secure the collector ring body to the shaft. The clamp may lockably engage with the shaft in order to secure the collector ring body to the shaft.

Advantages of embodiments of the present disclosure include that it is possible to reduce the length of the collector ring body (because of the different method used to attach the collector ring body to the shaft), that the collector ring body may not need to be as precisely machined with tight tolerances on the collector ring body and the shaft in order to secure the collector ring body to the shaft (as may be required for an interference fit), and that it may be possible to attach the collector ring body to the shaft by hand (rather than requiring a machine such as a press to forcefully press the collector ring body onto the shaft). For example, in certain embodiments the overall length of the collector ring body may be reduced from 2.6 inches (or 2.5 to 3 inches) to 1.75 inches (or 1.5 to 2 inches). By reducing the length of the collector ring assembly, it may be possible to reduce the length of a rotor assembly as a whole. Further, for retention and anti-rotation there are features on the shaft and the rotor clip that capture the collector ring plastic. This allows both parts to be a looser fit and removes need for tight tolerances, and allows for potential hand installation.

Figure 4A:
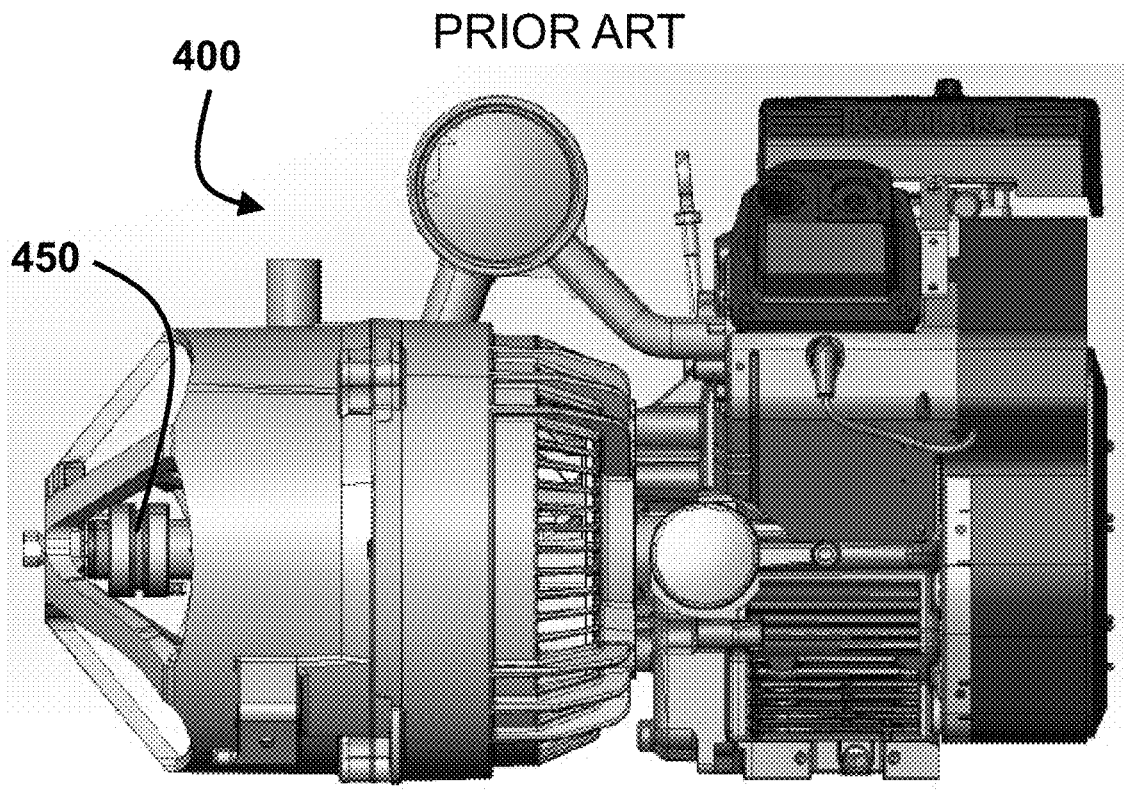
FIG. 4A illustrates an example existing generator assembly.
Figure 4B:
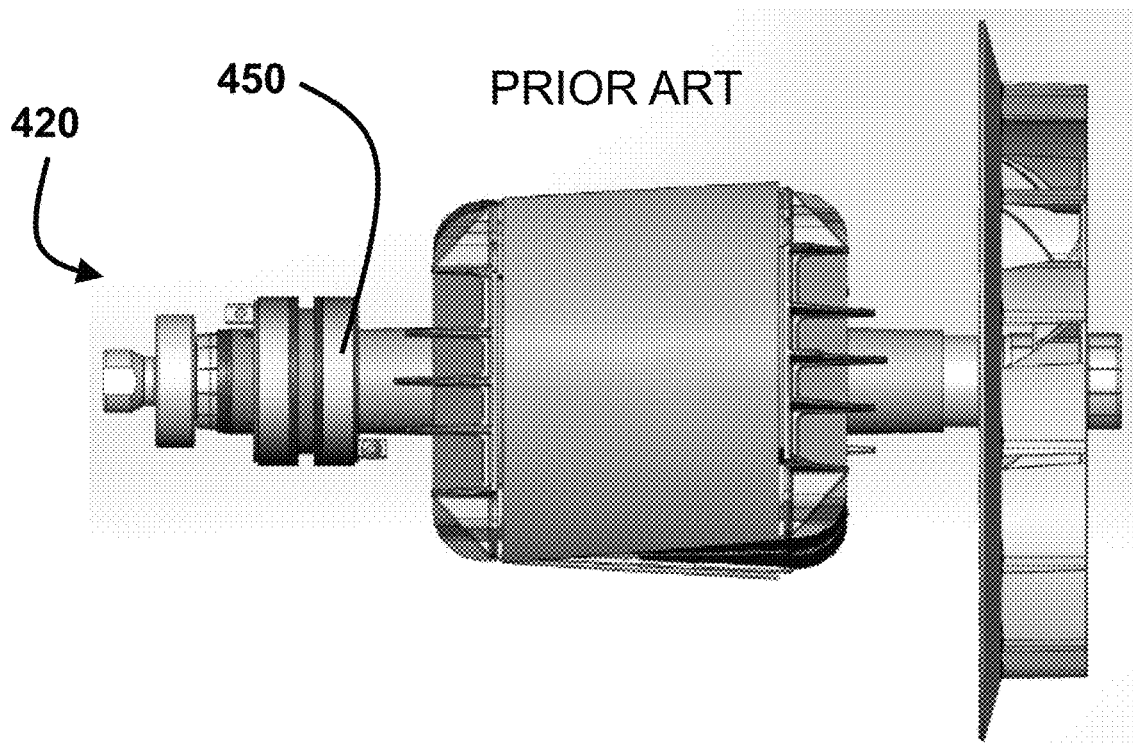
FIG. 4B illustrates an example existing rotor assembly.

FIG. 4A illustrates an example generator 400 incorporating an existing rotor assembly, which incorporates an existing collector ring assembly 450. FIG. 4B illustrates an example rotor assembly 420 incorporating an existing collector ring assembly 450. By incorporating a collector ring assembly according to the present disclosure into the generator 400 and rotor assembly 420 shown in FIGS. 4A and 4B, it is possible to reduce the length of both the generator 400 and the rotor assembly 420.

According to certain embodiments of the present disclosure, the collector ring body may be fixedly attached to the shaft such that it is not removable after the collector ring body is lockably attached to the shaft. For example, the collector ring body may be glued or otherwise secured in a permanent fashion to the shaft. According to certain other embodiments, the collector ring body may be removably attached to the shaft such that it may be removed for servicing, for example.

According to the present disclosure, the term "lockably attached" means a form of mechanical attachment beyond an interference fit. A lockable attachment may additionally include an interference fit, but it is understood not to be limited to an interference fit alone. Lockable attachments may be toolless or "snap fits". Lockable attachments may include using cantilevered clips, annular rings, annular grooves, protrusions, depressions, and threadable connections, in conjunction with each other where applicable.

According to the present disclosure, the term "collector ring assembly" is intended to be used interchangeably with the term "slip ring assembly". Such a collector ring assembly is understood to comprise continuous, electrically conductive collector rings (also known as slip rings). To the extent feasible, embodiments of the present disclosure may be used with commutator rings, which are understood to comprise stepped electrically conductive rings (instead of continuous rings).

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

Some of the elements described herein are identified explicitly as being optional, while other elements are not identified in this way. Even if not identified as such, it will be noted that, in some examples, some of these other elements are not intended to be interpreted as being necessary, and would be understood by one skilled in the art as being optional.

While the present disclosure has been described with reference to certain implementations, it will be understood by those skilled in the art that various changes may be made and equivalents may be substituted without departing from the scope of the present method or system. In addition, many modifications may be made to adapt a particular situation or material to the teachings of the present disclosure without departing from its scope. For example, systems, blocks, or other components of disclosed examples may be combined, divided, re-arranged, or otherwise modified. Therefore, the present disclosure is not limited to the particular implementations disclosed. Instead, the present disclosure will include all implementations falling within the scope of the appended claims, both literally and under the doctrine of equivalents.

The invention claimed is:

1. A collector ring assembly comprising:
    a shaft extending along a longitudinal axis from a proximal end to a distal end,
    a collector ring body, and
    at least one collector ring that is positioned on and retained by the collector ring body;
    wherein the shaft comprises a radial axis extending away from the longitudinal axis and a surface that circumscribes the longitudinal axis at a distance along the radial axis;
    wherein the collector ring body fits over the surface of the shaft;

wherein the shaft comprises a shaft mating feature, the shaft mating future comprising an annular mating groove that extends inwards from the surface along the radial axis;
wherein the collector ring body comprises a collector ring mating feature, the collector ring mating feature comprising an annular ring; and
wherein the shaft mating feature and the collector ring mating feature lockably engage to secure the collector ring body to the shaft such that the collector ring body is limited from being able to move either along, or rotatably around, the longitudinal axis.

2. The collector ring assembly of claim 1, wherein the shaft mating feature further comprises a mating ring that extends away from the surface along the radial axis.

3. The collector ring assembly of claim 2, wherein the collector ring mating feature further comprises a cantilevered clip extending along the longitudinal axis, wherein the cantilevered clip is biased towards the shaft along the radial axis.

4. The collector ring assembly of claim 1, wherein the shaft mating feature further comprises a plurality of mating protrusions that extend away from the surface along the radial axis.

5. The collector ring assembly of claim 4, wherein the collector ring mating feature further comprises a plurality of cantilevered clips extending along the longitudinal axis, wherein the cantilevered clips are biased towards the shaft along the radial axis.

6. The collector ring assembly of claim 1, wherein the shaft mating feature further comprises a plurality of mating depressions that extend inwards from the surface along the radial axis.

7. The collector ring assembly of claim 6, wherein the collector ring mating feature further comprises a plurality of cantilevered clips extending along the longitudinal axis, wherein the cantilevered clips are biased towards the shaft along the radial axis.

8. A method for securing a collector ring body to a shaft comprising:
attaching a collector ring body to a shaft by sliding the collector ring body over the shaft until an annular ring of the collector ring body lockably engages with an annular mating groove of the shaft to secure the collector ring body to the shaft such that the collector ring body is limited from being able to move either along, or rotatably around, a longitudinal axis;
wherein at least one collector ring is positioned on and retained by the collector ring body;
wherein the shaft extends along the longitudinal axis from a distal end to a proximal end;
wherein the shaft comprises a radial axis extending away from the longitudinal axis and a surface that circumscribes the longitudinal axis at a distance along the radial axis;
wherein the annular mating groove of the shaft extends inwards from the surface along the radial axis; and
wherein the collector ring body fits over the surface of the shaft.

9. The method of claim 8, wherein the shaft further comprises a mating ring that extends away from the surface along the radial axis, the collector ring body further comprises a cantilevered clip extending along the longitudinal axis, the cantilevered clip is biased towards the shaft along the radial axis, and
the method further comprises attaching the collector ring body to the shaft further comprises sliding the collector ring body over the shaft until the cantilevered clip lockably engages with the mating ring.

10. The method of claim 8, wherein the collector ring body further comprises a cantilevered clip extending along the longitudinal axis, the cantilevered clip is biased towards the shaft along the radial axis, and
the method further comprises attaching the collector ring body to the shaft further comprises sliding the collector ring body over the shaft until the cantilevered clip lockably engages with the annular mating groove.

11. The method of claim 8, wherein the shaft further comprises a plurality of mating protrusions that extend away from the surface along the radial axis, the collector ring body further comprises a plurality of cantilevered clips extending along the longitudinal axis, wherein the cantilevered clips are biased towards the shaft along the radial axis, and
the method further comprises attaching the collector ring body to the shaft further comprises sliding the collector ring body over the shaft until the plurality of cantilevered clips lockably engage with respective mating protrusions of the plurality of mating protrusions.

12. The method of claim 8, wherein the shaft further comprises a plurality of mating depressions that extend inwards from the surface along the radial axis,
the collector ring body further comprises a plurality of cantilevered clips extending along the longitudinal axis, wherein the cantilevered clips are biased towards the shaft along the radial axis, and the method further comprises
attaching the collector ring body to the shaft further comprises sliding the collector ring body over the shaft until the plurality of cantilevered clips lockably engage with respective mating depressions of the plurality of mating depressions.

13. A collector ring assembly comprising:
a shaft extending along a longitudinal axis from a proximal end to a distal end;
a collector ring body; and
at least one collector ring that is positioned on and retained by the collector ring body,
wherein the shaft comprises a radial axis extending away from the longitudinal axis and a surface that circumscribes the longitudinal axis at a distance along the radial axis, the collector ring body fits over the surface of the shaft, the shaft comprises a shaft mating feature, the shaft mating feature comprising a plurality of mating depressions that extend inwards from the surface along the radial axis, the collector ring body comprises a collector ring mating feature, and the shaft mating feature and the collector ring mating feature lockably engage to secure the collector ring body to the shaft such that the collector ring body is limited from being able to move either along, or rotatably around, the longitudinal axis.

14. The collector ring assembly of claim 13, wherein the shaft mating feature further comprises a mating ring that extends away from the surface along the radial axis.

15. The collector ring assembly of claim 13, wherein the collector ring mating feature further comprises a cantilevered clip extending along the longitudinal axis, wherein the cantilevered clip is biased towards the shaft along the radial axis.

16. The collector ring assembly of claim 13, wherein the shaft mating feature further comprises a plurality of mating protrusions that extend away from the surface along the radial axis.

17. The collector ring assembly of claim 16, wherein the collector ring mating feature further comprises a plurality of cantilevered clips extending along the longitudinal axis, wherein the cantilevered clips are biased towards the shaft along the radial axis.

18. The collector ring assembly of claim 13, wherein the collector ring mating feature further comprises a plurality of cantilevered clips extending along the longitudinal axis, wherein the cantilevered clips are biased towards the shaft along the radial axis.

* * * * *